United States Patent
Shevde et al.

(10) Patent No.: US 10,128,689 B2
(45) Date of Patent: Nov. 13, 2018

(54) SYSTEMS AND METHODS FOR ENABLING A UNIVERSAL BACK-COVER WIRELESS CHARGING SOLUTION

(71) Applicant: QUALCOMM Incorporated, San Diego, CA (US)

(72) Inventors: Sumukh Ashok Shevde, Carlsbad, CA (US); Joseph Najib Maalouf, San Diego, CA (US); Francesco Carobolante, Carlsbad, CA (US)

(*) Notice: Subject to any disclaimer, the term of this patent is extended or adjusted under 35 U.S.C. 154(b) by 180 days.

(21) Appl. No.: 15/344,404

(22) Filed: Nov. 4, 2016

(65) Prior Publication Data
US 2017/0093201 A1 Mar. 30, 2017

Related U.S. Application Data

(60) Division of application No. 14/337,049, filed on Jul. 21, 2014, now Pat. No. 9,490,653, which is a
(Continued)

(51) Int. Cl.
*H02J 7/00* (2006.01)
*H04B 1/38* (2015.01)
(Continued)

(52) U.S. Cl.
CPC ............... *H02J 50/12* (2016.02); *H02J 7/00* (2013.01); *H02J 7/0052* (2013.01); *H02J 7/045* (2013.01);
(Continued)

(58) Field of Classification Search
CPC .. H02J 50/12; H02J 50/90; H02J 50/40; H02J 50/60; H02J 7/00; H02J 7/0052;
(Continued)

(56) References Cited

U.S. PATENT DOCUMENTS 7,076,378 B1 7/2006 Huebner
7,893,665 B2 * 2/2011 Belch ............... H02M 3/1582
323/222
(Continued)

FOREIGN PATENT DOCUMENTS

EP 2333932 A1 6/2011
JP 2008099370 A 4/2008
(Continued)

OTHER PUBLICATIONS

International Search Report and Written Opinion—PCT/US2014/047640—ISA/EPO—dated Dec. 9, 2014.
(Continued)

*Primary Examiner* — Phallaka Kik

(57) ABSTRACT

Systems and methods for converting voltages between different voltage levels in a receiver are disclosed. In an aspect, a wireless power receiver apparatus for charging a chargeable device is provided. The apparatus includes a plurality of receive antennas disposed on a cover of the chargeable device, wherein at least one of the plurality of receive antennas is configured to wirelessly receive power according to a wireless charging protocol different from at least one other of the plurality of receive antennas. The apparatus includes a switching circuit disposed on the cover and configured to receive the wireless power from at least one of the plurality of receive antennas and selectively provide a respective voltage from a corresponding one of the plurality of receive antennas across an output configured to be connected to an input of the chargeable device.

20 Claims, 14 Drawing Sheets

Related U.S. Application Data continuation-in-part of application No. 14/259,012, filed on Apr. 22, 2014, now Pat. No. 9,401,622.

(60) Provisional application No. 61/857,603, filed on Jul. 23, 2013, provisional application No. 61/973,799, filed on Apr. 1, 2014.

(51) Int. Cl.
| | | |
|---|---|---|
| *H04M 1/80* | (2006.01) | |
| *H02J 50/12* | (2016.01) | |
| *H02J 50/90* | (2016.01) | |
| *H02J 50/60* | (2016.01) | |
| *H02J 50/40* | (2016.01) | |
| *H02J 7/04* | (2006.01) | |
| *H04B 7/185* | (2006.01) | |

(52) U.S. Cl.
CPC ............. *H02J 50/40* (2016.02); *H02J 50/60* (2016.02); *H02J 50/90* (2016.02); *H02J 7/007* (2013.01); *H04B 1/38* (2013.01); *H04B 7/185* (2013.01); *H04M 1/80* (2013.01)

(58) Field of Classification Search
CPC .. H02J 7/045; H02J 7/007; H04B 1/38; H04B 1/185; H04M 1/80
USPC .... 320/108, 109, 114; 455/573, 13.4, 575.7, 455/270; 323/371
See application file for complete search history.

(56) References Cited

U.S. PATENT DOCUMENTS

| | | |
|---|---|---|
| 8,093,745 B2 | 1/2012 | Cern |
| 9,095,729 B2 | 8/2015 | John |
| 9,178,378 B2 | 11/2015 | Yoon |
| 9,231,428 B2 | 1/2016 | Yoon et al. |
| 9,401,622 B2 | 7/2016 | Carobolante et al. |
| 9,490,653 B2 | 11/2016 | Shevde et al. |
| 2003/0071602 A1 | 4/2003 | Ando |
| 2005/0185463 A1 | 8/2005 | Kanamori et al. |
| 2005/0237825 A1 | 10/2005 | Kawajiri et al. |
| 2007/0120421 A1 | 5/2007 | Boys |
| 2007/0279002 A1 | 12/2007 | Partovi et al. |
| 2008/0058029 A1 | 3/2008 | Sato et al. |
| 2008/0100272 A1 | 5/2008 | Yoshio |
| 2009/0067208 A1 | 3/2009 | Martin et al. |
| 2010/0148723 A1 | 6/2010 | Cook et al. |
| 2010/0181964 A1 | 7/2010 | Huggins et al. |
| 2010/0201314 A1 | 8/2010 | Toncich et al. |
| 2010/0231340 A1 | 9/2010 | Fiorello et al. |
| 2011/0050164 A1 | 3/2011 | Partovi et al. |
| 2011/0086256 A1 | 4/2011 | Julstrom et al. |
| 2011/0140655 A1 | 6/2011 | Nagatsuka et al. |
| 2011/0210620 A1 | 9/2011 | Shinoda et al. |
| 2011/0285349 A1 | 11/2011 | Widmer et al. |
| 2011/0291613 A1 | 12/2011 | Rosik et al. |
| 2011/0316475 A1 | 12/2011 | Jung et al. |
| 2012/0088555 A1 | 4/2012 | Hu |
| 2012/0149301 A1 | 6/2012 | Wiley |
| 2012/0153903 A1 | 6/2012 | Kim et al. |
| 2012/0235497 A1 | 9/2012 | Sakai et al. |
| 2012/0280650 A1 | 11/2012 | Kim et al. |
| 2012/0303980 A1 | 11/2012 | Culbert et al. |
| 2013/0002038 A1 | 1/2013 | Lee et al. |
| 2013/0043734 A1 | 2/2013 | Stone et al. |
| 2013/0099585 A1 | 4/2013 | Von Novak et al. |
| 2013/0099735 A1 | 4/2013 | Partovi |
| 2013/0119929 A1 | 5/2013 | Partovi |
| 2013/0181539 A1 | 7/2013 | Muratov et al. |
| 2013/0214611 A1 | 8/2013 | Bae |
| 2013/0234658 A1 | 9/2013 | Endo et al. |
| 2013/0307344 A1 | 11/2013 | Cheon et al. |
| 2014/0055078 A1 | 2/2014 | Jing |
| 2014/0073241 A1* | 3/2014 | Luong ................ H04B 5/00 455/41.1 |
| 2014/0084688 A1 | 3/2014 | Tzanidis et al. |
| 2014/0117921 A1 | 5/2014 | Suomela |
| 2014/0159501 A1 | 6/2014 | Kanno et al. |
| 2014/0159508 A1* | 6/2014 | Sankar ................ H02J 17/00 307/149 |
| 2014/0266010 A1 | 9/2014 | Newlin |
| 2014/0266019 A1 | 9/2014 | Pigott |
| 2015/0028801 A1* | 1/2015 | Carobolante ........ H02J 7/00 320/108 |
| 2015/0028803 A1* | 1/2015 | Shevde ............... H02J 7/0052 320/108 |
| 2015/0091508 A1 | 4/2015 | Meunier et al. |
| 2015/0222130 A1 | 8/2015 | Goma et al. |
| 2015/0244176 A1 | 8/2015 | Von Novak et al. |
| 2016/0372963 A1* | 12/2016 | Sankar ................ H02J 7/027 |

FOREIGN PATENT DOCUMENTS

| | | |
|---|---|---|
| WO | WO-2010093969 A2 | 8/2010 |
| WO | WO-2013048053 A1 | 4/2013 |
| WO | WO-2013059330 A1 | 4/2013 |

OTHER PUBLICATIONS

Ng V.W., et al., "Switched Capacitor DC-DC Converter: Superior where the Buck Converter has Dominated," Technical Report No. UCB/EECS-2011-94, Aug. 17, 2011, 141 pages.
European Search Report—EP17191699—Search Authority—Munich—dated Nov. 17, 2017.

* cited by examiner

SYSTEMS AND METHODS FOR ENABLING A UNIVERSAL BACK-COVER WIRELESS CHARGING SOLUTION

CLAIM OF PRIORITY UNDER 35 U.S.C. § 119

The present Application for Patent is a divisional of and claims priority to Non-Provisional patent application Ser. No. 14/337,049, (now U.S. Pat. No. 9,490,653) entitled "SYSTEMS AND METHODS FOR ENABLING A UNIVERSAL BACK-COVER WIRELESS CHARGING SOLUTION," which is a continuation-in-part of and claims priority to Non-Provisional patent application Ser. No. 14/259,012, now U.S. Pat. No. 9,401,622, entitled "SYSTEMS AND METHODS FOR EXTENDING THE POWER CAPACITY OF A WIRELESS CHARGER," which claims priority to 61/857,603 entitled "SYSTEMS AND METHODS FOR EXTENDING THE POWER CAPABILITY OF A WIRELESS CHARGER" filed Jul. 23, 2013. The present Application for Patent additionally claims priority to Provisional Application No. 61/973,799 entitled "SYSTEMS AND METHODS FOR ENABLING A UNIVERSAL BACK-COVER WIRELESS CHARGING SOLUTION" filed Apr. 1, 2014. Non-Provisional patent application Ser. No. 14/337,049 (now U.S. Pat. No. 9,490,653) and Ser. No. 14/259,012 (now U.S. Pat. No. 9,401,622) and Provisional Application Nos. 61/973,799 and 61/857,603 have been assigned to the assignee hereof and are hereby expressly incorporated by reference herein.

FIELD

The present application relates generally to wireless power. More specifically, the disclosure is directed to systems and methods for enabling universal back cover wireless charging solutions.

BACKGROUND

Wireless charging implementations today use a back-cover design where the antenna/resonator for the receiver and the power conversion printed circuit board (PCB) is placed in the back cover of the phone and the DC output is directly connected to the charge port pins on the main board of the PCB. Today, we have multiple wireless charging standards—all of which typically provide a different DC output voltage to the charge port pins. Handset OEMs that design phones with wireless charging would like to have a solution that allows them to use any wireless charging based back-cover with the existing phone without making changes in the phone's design. Currently, there is no such solution available. The proposal below is a solution that allows handset OEMs to pair any wireless charging based back cover with the handset without making any changes.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In some implementations, a wireless power receiver apparatus for charging a chargeable device is provided. The apparatus comprises a plurality of receive antennas disposed on a cover of the chargeable device, at least one of the plurality of receive antennas configured to wirelessly receive power according to a wireless charging protocol different from at least one other of the plurality of receive antennas. The apparatus comprises a switching circuit disposed on the cover and configured to receive the wireless power from at least one of the plurality of receive antennas and selectively provide a respective voltage from a corresponding one of the plurality of receive antennas across an output configured to be connected to an input of the chargeable device.

In some other implementations, a method for charging a chargeable device comprises wirelessly receiving power from at least one of a plurality of receive antennas disposed on a cover of the chargeable device, wherein at least one of the plurality of receive antennas is configured to wirelessly receive power according to a wireless charging protocol different from at least one other of the plurality of receive antennas. The method comprises selectively providing a respective voltage from a corresponding one of the plurality of receive antennas across an output configured to be connected to an input of the chargeable device utilizing a switching circuit disposed on the cover.

In yet other implementations, a wireless power receiver apparatus for charging a chargeable device is provided. The apparatus comprises a plurality of means for wirelessly receiving power disposed on a cover of the chargeable device. At least one of the plurality of means for wirelessly receiving power is configured to wirelessly receive power according to a wireless charging protocol different from at least one other of the plurality of means for wirelessly receiving power. The apparatus comprises means for switching disposed on the cover of the chargeable device and configured to receive the wireless power from at least one of the plurality of means for receiving wireless power and selectively provide a respective voltage from a corresponding one of the plurality of means for wirelessly receiving power across an output configured to be connected to an input of the chargeable device.

In yet other implementations, a wirelessly chargeable apparatus is provided. The apparatus comprises an input configured to be connected to an output of a cover of the chargeable apparatus. The apparatus comprises a converter circuit configurable to be coupled to one of a plurality of receive antennas on the cover of the chargeable apparatus via the input. The one of the plurality of receive antennas is configured to wirelessly receive power according to a wireless charging protocol different from at least one other of the plurality of receive antennas. The converter circuit is configured to selectively receive an input voltage from the one of the plurality of receive antennas. The converter circuit is configured to produce an output voltage that is scaled relative to the input voltage based on a relationship between the input voltage and a voltage level threshold.

In yet other implementations, a method for wirelessly charging a chargeable device is provided. The method comprises selectively receiving an input voltage, across an input of the chargeable device, from one of a plurality of receive antennas disposed on a cover of the chargeable device. The one of the plurality of receive antennas are configured to wirelessly receive power according to a wireless charging protocol different from at least one other of the plurality of receive antennas. The method comprises producing an output voltage that is scaled relative to the input voltage based on a relationship between the input voltage and a voltage level threshold.

In yet other implementations, a wirelessly chargeable apparatus is provided. The apparatus comprises means for selectively receiving an input voltage from one of a plurality of receive antennas. At least one of the plurality of receive antennas is configured to wirelessly receive power according to a wireless charging protocol different from at least one other of the plurality of receive antennas. The apparatus further comprises means for producing an output voltage that is scaled relative to the input voltage based on a relationship between the input voltage and a voltage level threshold.

DETAILED DESCRIPTION

The detailed description set forth below in connection with the appended drawings is intended as a description of exemplary implementations and is not intended to represent the only implementations which may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receiving antenna" to achieve power transfer. It will be understood that, throughout this specification, two components being "coupled" may refer to their interaction through direct or indirect ways, and may further refer to a physically connected (e.g. wired) coupling or a physically disconnected (e.g. wireless) coupling.

Figure 1:
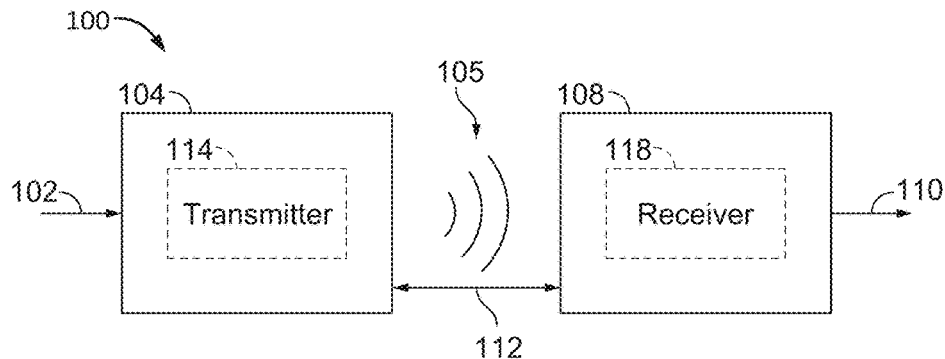
FIG. 1 is a functional block diagram of an exemplary wireless power transfer system, in accordance with an exemplary implementation.

FIG. 1 is a functional block diagram of an exemplary wireless power transfer system 100, in accordance with an exemplary implementation. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary implementation, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 108. In some cases, the field 105 may correspond to the "near-field" of the transmitter 104 as will be further described below. The transmitter 104 may include a transmit antenna 114 (e.g., a transmit coil) for outputting an energy transmission. The receiver 108 further includes a receive antenna 118 (e.g., a receive coil) for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
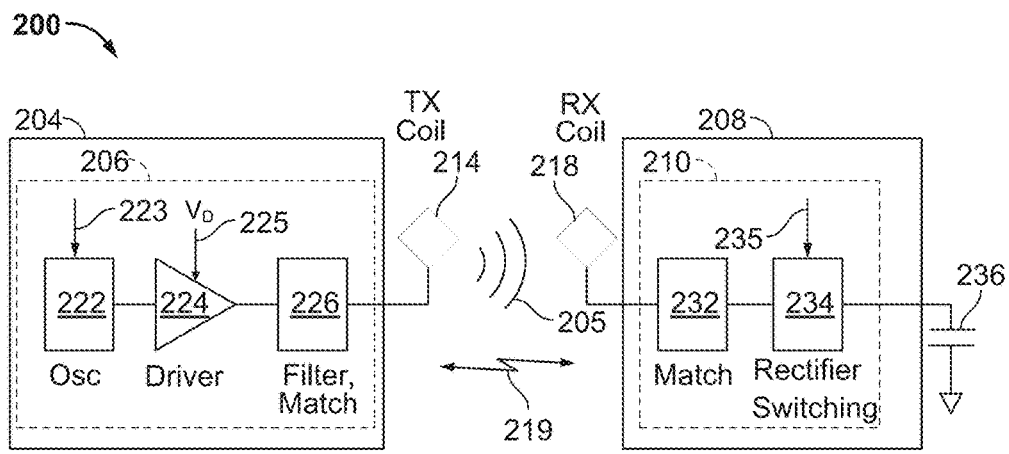
FIG. 2 is a functional block diagram of exemplary components that may be used in the wireless power transfer system of FIG. 1, in accordance with an exemplary implementation.

FIG. 2 is a functional block diagram of exemplary components that may be used in the wireless power transfer system 100 of FIG. 1, in accordance with an exemplary implementation. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, receiver 208, that may initially have a selectively disabled associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some implementations, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
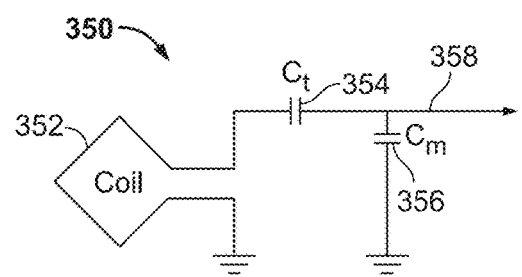
FIG. 3 is a schematic diagram of a portion of transmit circuitry or receive circuitry of FIG. 2 including a transmit or receive antenna, in accordance with an exemplary implementation.

FIG. 3 is a schematic diagram of a portion of transmit circuitry 206 or receive circuitry 210 of FIG. 2 including a transmit or receive antenna 352, in accordance with an exemplary implementation. As illustrated in FIG. 3, transmit or receive circuitry 350 used in exemplary implementations including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy from coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). An air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 205 of the transmit antenna 214 coil to the receive antenna 218 residing in the neighborhood where this field 205 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 354 and capacitor 356 may be added to the transmit or receive circuitry 350 to create a resonant circuit that selects a signal at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 352. For transmit antennas, a signal 358 with a frequency that substantially corresponds to the resonant frequency of the antenna 352 may be an input to the antenna 352.

In one implementation, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
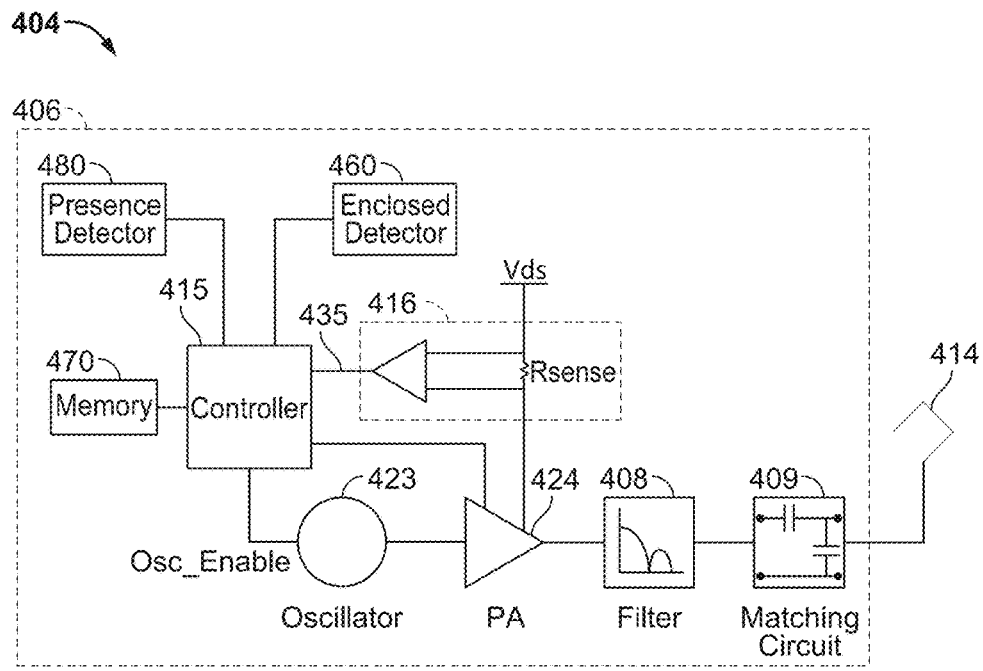
FIG. 4 is a functional block diagram of a transmitter that may be used in the wireless power transfer system of FIG. 1, in accordance with an exemplary implementation.

FIG. 4 is a functional block diagram of a transmitter 404 that may be used in the wireless power transfer system of FIG. 1, in accordance with an exemplary implementation. The transmitter 404 may include transmit circuitry 406 and a transmit antenna 414. The transmit antenna 414 may be the antenna 352 as shown in FIG. 3. Transmit circuitry 406 may provide radio frequency (RF) power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary implementations may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as a processor. Adjustment of oscillator phase and related circuitry in the transmission path may allow for proper control of the system.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receivers that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC voltage converter (not shown) to convert conventional AC power present in a building, a DC-DC voltage converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary implementations, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary implementations, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
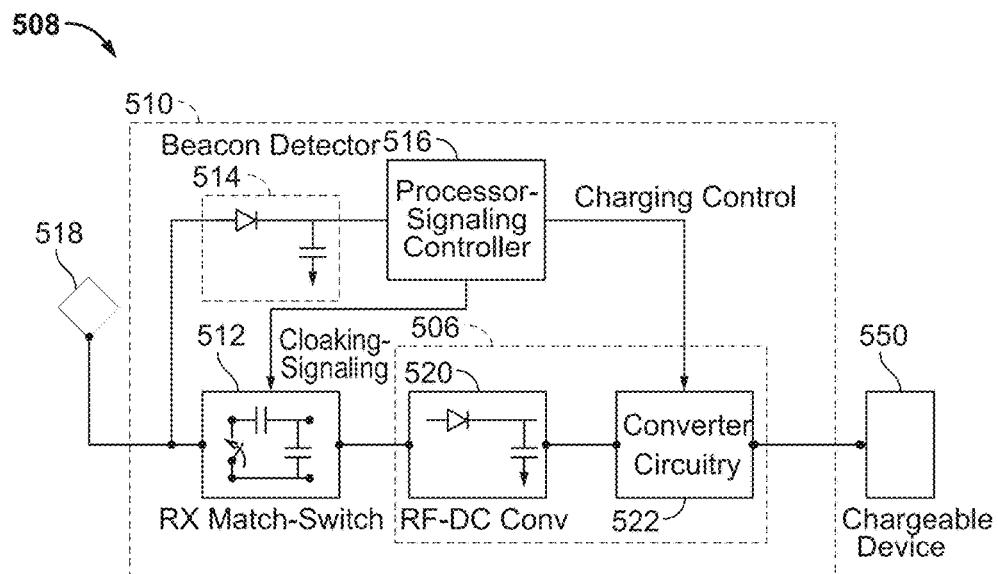
FIG. 5 is a functional block diagram of a receiver that may be used in the wireless power transfer system of FIG. 1, in accordance with an exemplary implementation.

FIG. 5 is a functional block diagram of a receiver 508 that may be used in the wireless power transfer system of FIG. 1, in accordance with an exemplary implementation. The receiver 508 includes receive circuitry 510 that may include a receive antenna 518. Although not shown in this figure, the receiver 508 may include a plurality of receive antennas 518. In some implementations, each of the plurality of receive antennas 518 may be configured to receive wireless power according to a corresponding one of a plurality of different wireless charging standards. Receiver 508 further couples to chargeable device 550 for providing received power thereto. It should be noted that receiver 508 is illustrated as being external to chargeable device 550 but may be integrated into chargeable device 550. Energy may be propagated wirelessly to receive antenna 518 and then coupled through the rest of the receive circuitry 510 to chargeable device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Each of the receive antennas 518 may be tuned to resonate at the same frequency, or within a specified range of frequencies, as a corresponding transmit antenna 414 (FIG. 4). Each of receive antenna 518 may be similarly dimensioned with a corresponding transmit antenna 414 or may be differently sized based upon the dimensions of the associated chargeable device 550. By way of example, chargeable device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of chargeable device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the chargeable device 550. Power conversion circuitry 506 includes an RF-to-DC voltage converter 520 and may also include converter circuitry 522. An RF-to-DC voltage converter 520 rectifies the RF energy signal received at receive antenna 518 into a non-alternating power with an output voltage represented by $V_{rect}$. The converter circuitry converts the rectified RF energy signal into an energy potential (e.g., voltage) that is compatible with chargeable device 550 with an output voltage and output current represented by $V_{out}$ and $I_{out}$. Various RF-to-DC voltage converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of chargeable device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary implementation, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to chargeable device 550. Processor 516, in addition to controlling the cloaking of the receiver, may also monitor beacon circuitry 514 to determine a beacon state and extract messages sent from the transmitter 404. Processor 516 may also adjust converter circuitry 522 for improved performance.

Although certain implementations are discussed above, there are many additional ways to implement wireless power transfer in accordance with different implementations. Various implementations of converter circuitry in accordance with select implementations are discussed below.

Converter Circuitry

Typically, a wireless receiver may be subject to a wide input voltage range due to the variability of mutual inductance between a transmitter and receiver and additionally or alternatively due to receiving power at different input voltages according to multiple wireless charging standards (e.g., wireless charging standards which may be based on different features such as based on magnetic resonance, based on non-resonance, based on a tightly coupled configuration, based on a loosely coupled configuration, and the like). However, the output voltage of the receiver may be constrained to a limited voltage range as dictated by a device charged using the receiver. This limited voltage range may be at lower voltage levels than the rectified voltage received wirelessly from a transmitter. A DC-to-DC down or buck converter may be utilized to convert a higher voltage level to a lower voltage level in a receiver. However, a DC-to-DC converter typically adds significant losses to the system.

In particular implementations, converter circuitry 522 may adapt to subsequent conversion stage voltage tolerance compatibility to increase the efficiency of the converter circuitry 522. For example, converter circuitry 522 may adapt to subsequent conversion stage voltage tolerance compatibility by operating intelligently based upon a relationship between the input voltage and a first voltage level threshold.

In select implementations, converter circuitry 522 may be implemented in series with the power management integrated circuitry (PMIC) in a receiver used to charge a chargeable device. Thereby, the converter circuitry 522 may intelligently convert different input DC voltages received from one or more receive antennas 518 to different output voltages dependent upon the value of the input voltage relative to the first voltage level threshold. For example, when the value of the input voltage is above a first voltage level threshold, the converter circuitry 522 may process the input voltage to produce an output voltage that is scaled to a reduced value relative to the input voltage, scaled to a greater value relative to the input voltage or scaled to a same value relative to the input voltage. Furthermore, when the value of the input voltage is at or below a first voltage level threshold, the converter circuitry 522 may process the input voltage to produce an output voltage that is scaled to a reduced value relative to the input voltage, scaled to a greater value relative to the input voltage or scaled to a same value relative to the input voltage. In certain implementations, an output voltage that is scaled to a same value relative to the input voltage may be accomplished by directly connecting the input of the converter circuitry 522 to the output of the converter circuitry. Alternatively, an output voltage that is scaled to a same value relative to the input voltage may be produced without directly connecting the input of the converter circuitry 522 to the output of the converter circuitry 522.

In particular implementations, converter circuitry 522 may produce different output voltages by being configured to multiply the input voltage by a scaling factor equal to a rational number. As a non-limiting example, converter circuitry 522 may produce different output voltages by multiplying the input voltage by a scaling factor of ½ to produce an output voltage that is scaled to a reduced value relative to the input voltage. As another non-limiting example, converter circuitry 522 may produce different output voltages by multiplying the input voltage by a scaling factor of 3 to produce an output voltage that is scaled to an increased value relative to the input voltage. As another non-limiting example, converter circuitry 522 may produce different output voltages by multiplying the input voltage by a scaling factor of 1 to produce an output voltage that is scaled to a same value relative to the input voltage. In various implementations, a scaling factor for when an output voltage is scaled to a reduced value relative to the input voltage may be different than a scaling factor for when an output voltage is scaled to an increased value relative to the input voltage. Although specific scaling factors are discussed herein, any scaling factor may be used in accordance with different implementations in different applications.

In certain implementations, the operation of converter circuitry 522 processes the input voltage such that the output voltage is limited to a value below a second voltage level threshold. For example, in certain implementations, an input of the converter circuitry 522 may receive a rectified voltage derived from a receive antenna. The voltage from the rectifier circuit may span a large range of voltages. As a non-limiting example, the voltage may span from substantially 5V to substantially 20V. The converter circuitry 522 may process the input voltage (the rectified voltage) such that the voltage at the output of the converter circuitry 522 is a scaled version of the input voltage. In particular implementations, the converter circuitry 522 may operate to scale the input voltage when the input voltage is above a first voltage level threshold such that the output voltage is half of the value of the value of the input voltage. For example, if the input voltage from the rectifier is from 5V to 20V, then the output voltage may be within a range of 5V to 10V.

In specific implementations, the converter circuitry 522 may include a configuration that increases the output voltage relative to the input voltage. This may occur by scaling up the output voltage based upon the value of the input voltage relative to the first voltage level threshold. In certain implementations, scaling may occur when the input voltage is at or lower than the first voltage level threshold. For example, if the input voltage from the rectifier is from 2.5V to 10V, then the output voltage may be scaled to be within a range of 5V to 10V. Alternatively, scaling may occur when the input voltage is above the first voltage level threshold. In certain implementations, converter circuitry 522 that increases an output voltage relative to an input voltage may be implemented by reversing the circuitry of converter circuitry 522 (such as but not limited to charge pump circuitry discussed further below) that decreases an output voltage relative to an input voltage.

Figure 6:
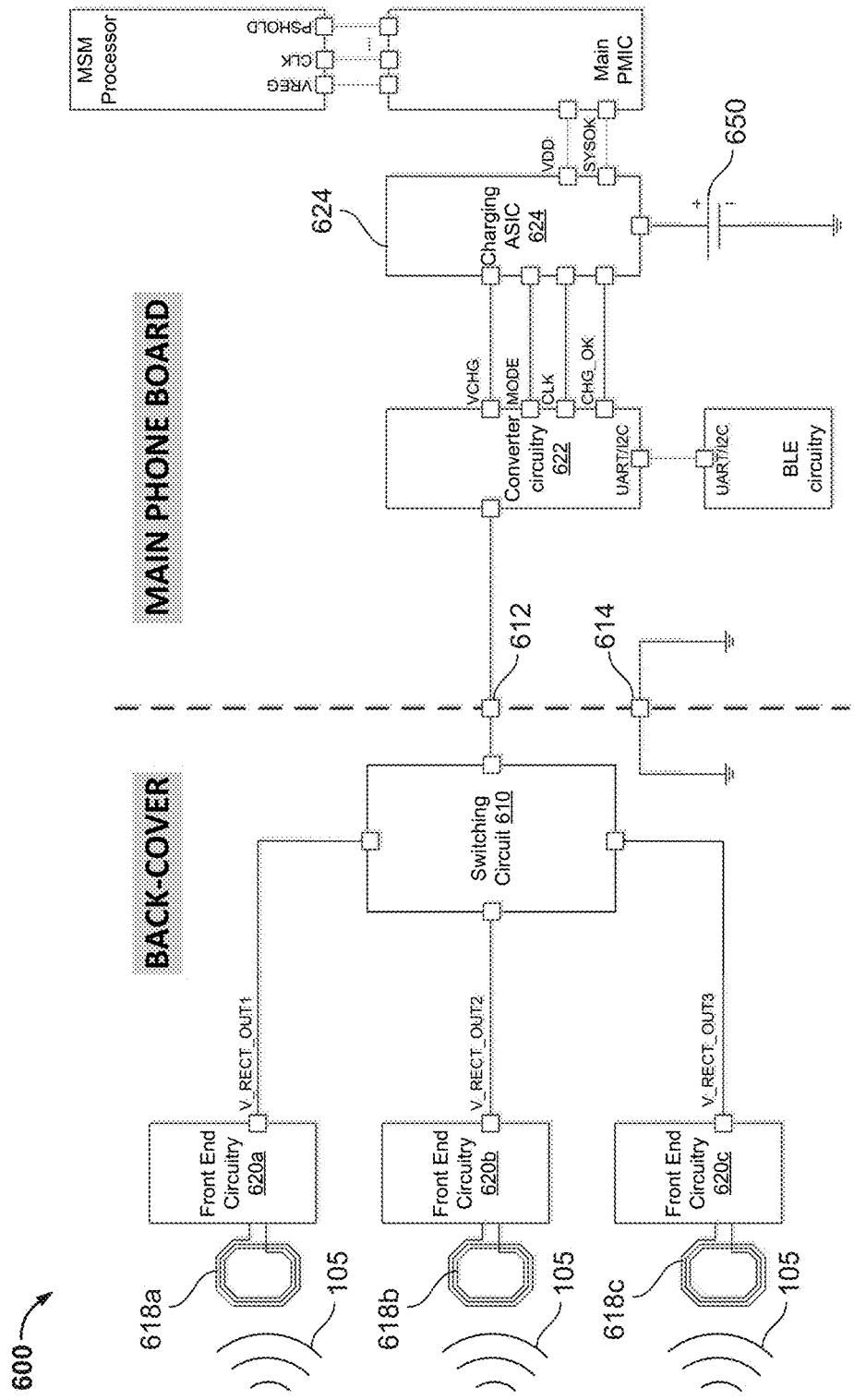
FIG. 6 is a functional block diagram of a plurality of receivers that utilize converter circuitry that may be used in the wireless power transfer system of FIG. 1, in accordance with an exemplary implementation.

FIG. 6 is a functional block diagram of a plurality of receivers that utilize converter circuitry that may be used in the wireless power transfer system of FIG. 1, in accordance with an exemplary implementation. FIG. 6 may correspond to the block diagram of FIG. 5 as described below. FIG. 6 may be described in connection with a mobile phone use case. However, the present application is not so limited and may apply to any wirelessly chargeable device. FIG. 6 may be divided up into a back cover portion, illustrated as all circuitry to the left of the dashed line, and a main phone board portion, illustrated as all circuitry to the right of the dashed line. For the purposes of this application the term "back cover" or "cover" may correspond to any portion of an apparatus that is removable and/or separable from the main body of the apparatus. Such a "back cover" or "cover" may include but is not limited to external covers, jackets, holders or sleeves, for example, that may be attached or attachable to the apparatus. Thus, while certain implementations described herein describe a "back cover," other portions or components of or attached to the apparatus may be utilized for implementing one or more features as described herein with respect to a "back cover".

Within the back cover portion, the receiver includes a plurality of receive antennas 618a, 618b and 618c. Each of the receive antennas 618a-618c may be configured to receive energy from a wireless field 105. Each of the antennas 618a-618c may be coupled to a corresponding front-end circuitry 620a, 620b, 620c. Each of the front-end circuitries 620a, 620b, 620c may comprise one or more of the circuits shown in FIG. 5 (e.g., RF-DC converter circuitry 520, etc.) and may be configured to receive an RF voltage, from a respective receive coil 618a-618c, as an input and output a corresponding, rectified DC voltage. One or more characteristics of the antennas 618a, 618b and 618c and/or the front-end circuitries 620a, 620b, 620c may be configured in accordance with a respective wireless charging standard (e.g., standards that operate according to different protocols, different voltage/power levels, different coil configurations, and the like). While FIG. 6 shows separate receive coils 618a-618c, in some implementations, the multiple front-end circuitries 620a, 620b, and 620c may share a single coil 618a. In addition, in some implementations a portion of circuitry in a front end circuitry 620a may be shared by multiple front-end circuitries 620a, 620b, and 620c. Because each of the front-end circuitries 620a-620c operates according to a different wireless charging standard, each may output a different rectified DC voltage. An output of each of the front-end circuitries 620a-620c may be coupled to a respective input of a switching circuit 610. An output of the switching circuit 610 may be coupled to a first charge port or pin 612 on a main circuit board of the phone. The switching circuit 610 may select a corresponding one of the rectified DC output voltages from the front-end circuits 620a-620c and supply the selected rectified DC output voltage to the first charge port 612. A second charge port 614 on both the main circuit board and the back cover may be connected to a voltage such as ground, for example. Exemplary implementations of the switching circuit 610 may be described in more detail below in connection with FIGS. 7 and 8.

Within the main phone board portion, the first charge port 612 may be connected to converter circuitry 622. In some implementations, the converter circuitry 622 may be connected to a Bluetooth Low Energy (BLE) circuit. The converter circuitry 622 may be configured to selectively receive an input voltage from one of the plurality of receive antennas 618a, 618b, or 618c and produce an output voltage that is scaled relative to the input voltage based on a relationship between the input voltage and a voltage level threshold as described above and further below. The converter circuitry 622 may be implemented as an integrated circuit (IC) and may include a charge pump IC as further described below. In some implementations, the converter circuitry 622 may receive one or more control signals from one or more other circuits. The converter circuitry 622 may be connected in series with a charging IC 624 and may supply a converted DC voltage to the charging IC 624. The charging IC 624 may utilize the converted DC voltage to charge a battery 650 of the phone or other chargeable device, or in the alternative, may utilize the converted DC voltage to directly power the phone or device (e.g., a main power management integrated circuit (PMIC) and/or a mobile station modem (MSM) processor). In some implementations, the converter circuitry 622 may operate in a pass-through mode or a divide-by-N mode, based at least in part on the voltage received at its input. For example, when the input voltage supplied to the converter circuitry 622 is less than a threshold, the converter circuitry 622 may pass the input voltage directly to its output. On the other hand, when the input voltage is greater than the threshold, the converter circuitry 622 may divide the input voltage by a rational number, N, and output the divided DC voltage. This may be described in more detail in connection with FIG. 18 below. As described above, each of the antennas 618a-618c/front-end circuits 620a-620c may operate according to a different wireless charging protocol and may therefore present a wide range of different output voltage levels to the charging IC 624. As described herein, the converter circuitry 622 is configured to receive a wide range of input voltages and to efficiently convert the wide range of input voltages into a range of voltages that can be received and properly utilized by the charging IC 624. Thus, by selectively connecting one of the plurality of rectified DC voltages from one of the front-end circuits 620a-620c and feeding them to the converter circuitry 622 (e.g., a charge pump circuit), a chargeable device may utilize the same two charge ports (612, 614) to provide universal charging compatibility with wireless chargers operating in accordance with multiple wireless charging standards with high efficiency. For example, in some implementations, the average voltage supplied by the antenna 618a operating according to a first charging protocol may always be below a voltage threshold of the converter circuitry 622. When receiving power via the antenna 618a according to the first charging protocol, the converter circuitry 622 may operate in the pass-through mode. However, the average voltage supplied by the antenna 618b operating according to a second, different, charging protocol, may be below or above the voltage threshold of the converter circuitry 622. When receiving power via the antenna 618b according to the second charging protocol, the converter circuitry 622 may alternate between the pass-through mode and a divide-by-N mode (e.g., divide-by-two). In this way, the converter circuitry 622 may be configured to provide an efficient conversion bridge between the front-end circuits 620a-620c that may produce a wide range of voltages resulting from the differences between the wireless charging protocols and the charging IC 624.

In particular implementations, operation of the converter circuitry 622 may be configured by one or more circuits within the chargeable device. The one or more circuits may configure any aspect of the operation of converter circuitry 622 for different applications in accordance with different implementations, including but not limited to the voltage level of the threshold, the voltage level that the converter circuitry 622 should be configured to produce, the range in which output voltage may be scaled within, and the scaling factor by which different output voltages may be produced by multiplying the input voltage by the scaling factor. The one or more circuits may set any aspect of the operation of converter circuitry 622 by communicating the configuration for the aspect of the operation of converter circuitry 622 to the converter circuitry 622. In certain implementations, an aspect of operation of converter circuitry 622 may be set by over-voltage protection circuitry and/or under-voltage detection circuitry. The over-voltage protection and under-voltage detection circuitry may be any circuitry on a chargeable device configured to manage the voltage, current or power input to the chargeable device.

Figure 7:
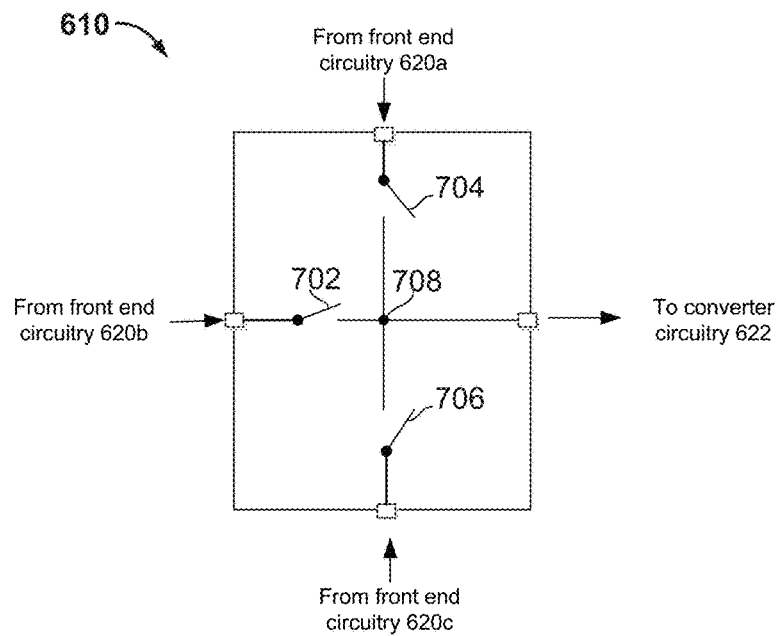
FIG. 7 is a block diagram of the switching circuit of FIG. 6, in accordance with an exemplary implementation.

FIG. 7 is a block diagram of the switching circuit 610 of FIG. 6, in accordance with an exemplary implementation. The switching circuit 610 may comprise a plurality of switches 702, 704 and 706, each having a first terminal connected to a respective one of the front end circuitries 620a-620c of FIG. 6 (not shown in FIG. 7). In this way, each of the switches 702, 704, 706 may receive a rectified DC voltage, when present, from the respective one of the front end circuitries 620a-620c of FIG. 6. A second terminal of each of the switches 702, 704, 706 may be connected to a common node 708, which may in turn be connected to the output of the switching circuit 610. Each of the switches 702, 704, 706 may be controlled directly or indirectly, for example, by one or more of the front end circuitries 620a-620c. In other implementations, such as that described below in connection with FIG. 8, switches within the switching circuit 610 may be self-controlled, such that when a rectified DC voltage is present from one of the front end circuitries 620a-620c the appropriate switches close and forward the present voltage to the converter circuitry 622.

Figure 8:
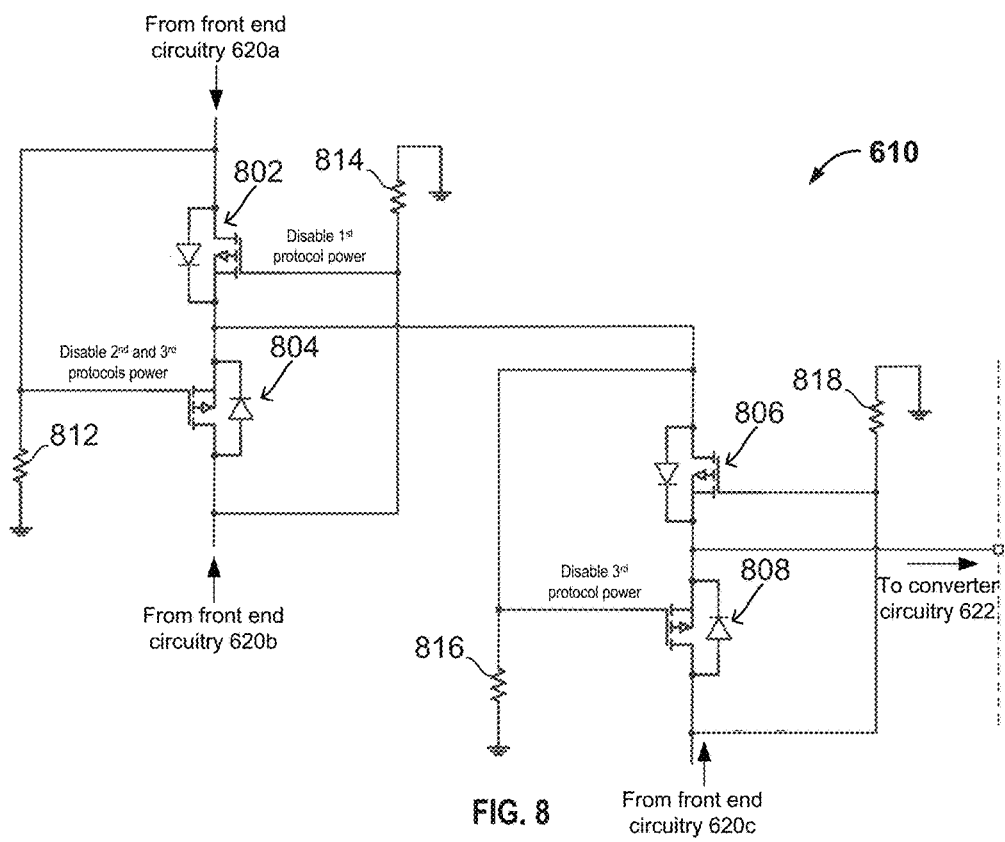
FIG. 8 is a block diagram of the switching circuit of FIG. 6 comprising back-to-back field effect transistors (FETs), in accordance with an exemplary implementation.

FIG. 8 is a block diagram of the switching circuit 610 of FIG. 6 comprising back-to-back field effect transistors (FETs), in accordance with an exemplary implementation. The switching circuit 610 may comprise two groupings of back-to-back connected MOSFETs. For example, a drain electrode of a first MOSFET 802 may receive an input from front end circuitry 620a and a source electrode of the first MOSFET 802 may be connected to a source electrode of a second MOSFET 804. A drain electrode of the second MOSFET 804 may receive an input from front end circuitry 620b, while a gate electrode of the second MOSFET may be connected to the drain electrode of the first MOSFET 802 as well as to a first terminal of a first resistor 812. The second terminal of the first resistor 812 may be connected to ground. The gate of the first MOSFET 802 may, likewise, be connected to the drain electrode of the second MOSFET 804 as well as to a first terminal of a second resistor 814. The second terminal of the second resistor 814 may be connected to ground. The source electrodes of each of the first and second MOSFETS 802/804 may be connected to a drain electrode of a third MOSFET 806. A source of the third MOSFET 806 may be connected to a source electrode of a fourth MOSFET 808 as well as to an output of the switching circuit 610, which may be provided to the converter circuitry 622. A drain electrode of the fourth MOSFET 808 may receive an input from the front end circuitry 620c. A gate electrode of the fourth MOSFET 808 may be connected to the drain electrode of the third MOSFET 806 as well as to a first terminal of a third resistor 816. A second terminal of the third resistor 816 may be connected to ground. A gate electrode of the third MOSFET 806 may, likewise, be connected to the drain electrode of the fourth MOSFET 808 as well as to a first terminal of a fourth resistor 818, while a second terminal of the fourth resistor 818 may be connected to ground.

In operation, if the wirelessly chargeable device (e.g., the mobile phone) is placed on a wireless charger operating according to a charging protocol supported by the front end circuitry 620a (e.g., a first charging protocol, for example), a rectified DC voltage may be impressed at the drain electrode of the first MOSFET 802 as well as the gate electrode of the second MOSFET 804. In such a condition, MOSFETs 802 and 806 will be ON, while MOSFETs 804 and 808 will be off. The rectified DC voltage from the front end circuitry 620a may be passed through MOSFETs 802 and 806 to converter circuitry 622 on the main phone PCB.

If the wirelessly chargeable device (e.g., the mobile phone) is placed on a wireless charger operating according to a charging protocol supported by the front end circuitry 620b (e.g., a second charging protocol, for example), a rectified DC voltage may be impressed at the drain electrode of the second MOSFET 804 as well as the gate electrode of the first MOSFET 802. In such a condition, MOSFETs 804 and 806 will be ON, while MOSFETs 802 and 808 will be off. The rectified DC voltage from the front end circuitry 620b may be passed through MOSFETs 804 and 806 to converter circuitry 622 on the main phone PCB.

If the wirelessly chargeable device (e.g., the mobile phone) is placed on a wireless charger operating according to a charging protocol supported by the front end circuitry 620c (e.g., a third charging protocol, for example), a rectified DC voltage may be impressed at the drain electrode of the fourth MOSFET 808 as well as the gate electrode of the third MOSFET 806. In such a condition, MOSFET 808 will be ON, while MOSFET 806 will be off. The rectified DC voltage from the front end circuitry 620c may be passed through MOSFET 808 to converter circuitry 622 on the main phone PCB.

The switching circuit 610 shown in FIG. 8 may be utilized where the back cover of the mobile device (e.g., phone) includes three different front end circuitries 620a-620c, thus supporting three different wireless charging protocols. In operation, the presence of a rectified DC voltage at any one of the three above-described inputs causes the appropriate MOSFET(s) to turn on/off such that the switching circuit 610 is self-regulating. Thus, no control signal, aside from the rectified DC voltages themselves, is needed to control the operation of the switching circuit 610.

Figure 9:
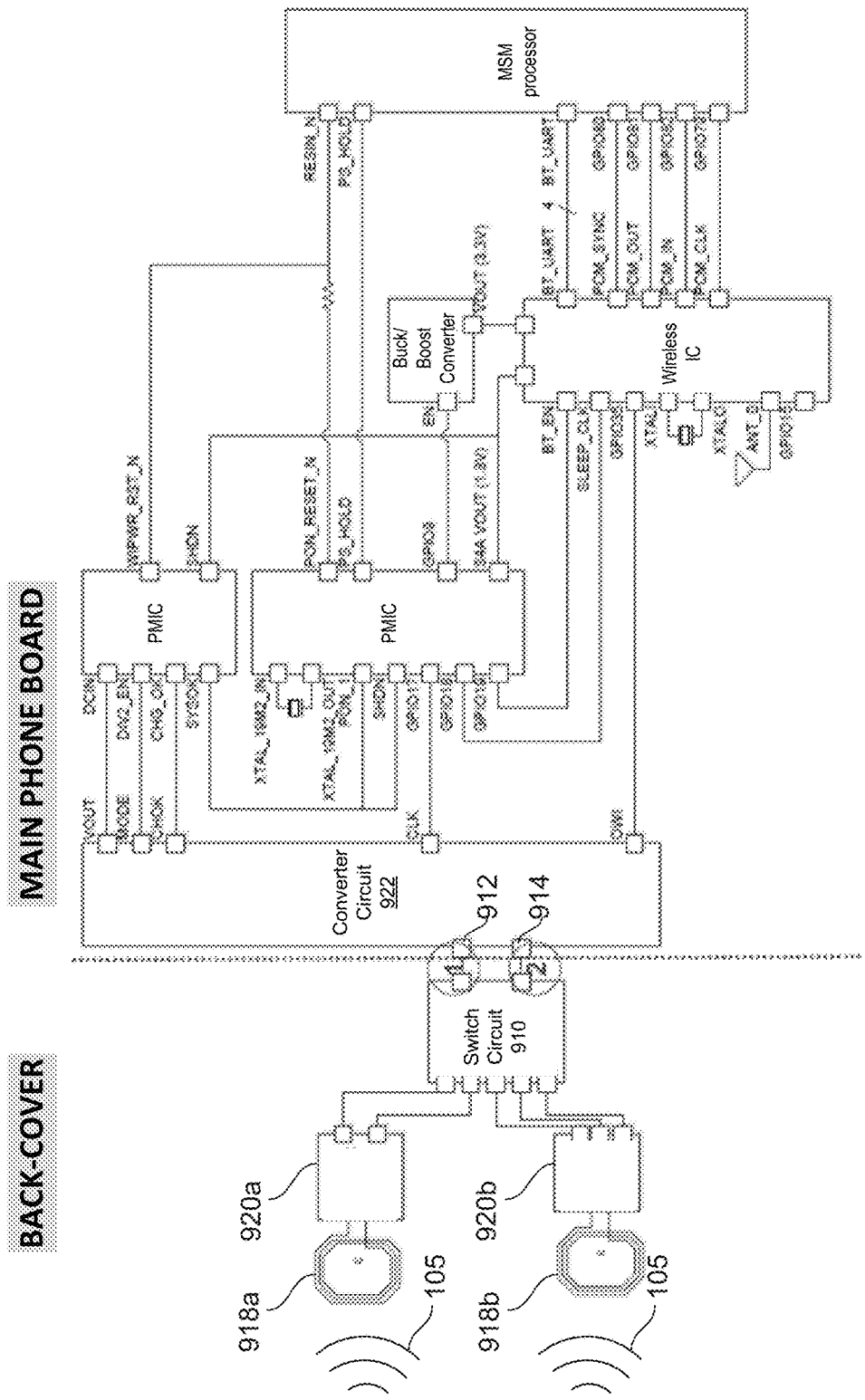
FIG. 9 is a functional block diagram of a plurality of receivers disposed on a backplate of a wirelessly chargeable device that utilizes converter circuitry, in accordance with an exemplary implementation.

FIG. 9 is a functional block diagram of a plurality of receivers disposed on a backplate of a wirelessly chargeable device that utilizes converter circuitry, in accordance with an exemplary implementation. FIG. 9 may be divided up into a back cover portion, illustrated as all circuitry to the left of the dashed line, and a main phone board portion, illustrated as all circuitry to the right of the dashed line. Within the back cover portion, the receiver includes a plurality of receive antennas 918a and 918b. Each of the receive antennas 918a and 918b may be configured to receive energy from a wireless field 105. Each of the antennas 918a and 918b may be coupled to a corresponding front-end circuitry 920a and 920b. Each of the front-end circuitries 920a and 920b may comprise one or more of the circuits shown in FIG. 5 (e.g., switching circuitry 506, RF-DC converter circuitry 520, etc.) and may be configured to receive an RF voltage, from a respective receive coil 918a and 918b, as an input and output a corresponding, rectified DC voltage. One or more characteristics of the antennas 918a and 918b and/or the front-end circuitries 920a and 920b may be configured in accordance with a respective wireless charging standard. While FIG. 9 shows separate receive coils 918a and 918b, in some implementations, the multiple front-end circuitries 920a and 920b may share a single coil 918a. In addition, in some implementations a portion of circuitry in a front end circuitry 920a may be shared by multiple front-end circuitries 920a and 920b. Because each of the front-end circuitries 920a and 920b operates according to a different wireless charging standard, each may output a different rectified DC voltage. An output of each of the front-end circuitries 920a and 920b may be coupled to a respective input of a switching circuit 910. An output of the switching circuit 910 may be coupled to a first charge port or pin 912 on a main circuit board of the phone. The switching circuit 910 may select a corresponding one of the rectified DC output voltages from the front-end circuits 920a and 920b and supply the selected rectified DC output voltage to the first charge port 912. The switching circuit 910 may comprise at least a portion of either of the circuits as previously described in connection with FIGS. 7 and 8. A second charge port 914 on each of the back cover and the main circuit board may be connected to a voltage such as ground (not shown), for example.

Within the main phone board portion, the first charge port 912 may be connected to converter circuitry 922. In some implementations, the converter circuitry 922 may be configured to selectively receive an input voltage from one of the plurality of receive antennas 918a or 918b and produce an output voltage that is scaled relative to the input voltage based on a relationship between the input voltage and a voltage level threshold as described above and further below. The converter circuitry 922 may be implemented as an integrated circuit (IC) and may include a charge pump IC as further described below In some implementations, the converter circuitry 922 may receive one or more control signals from one or more other circuits. In some implementations, the converter circuitry 922 may be connected in series with a charging IC (e.g., one or more power management integrated circuits (PMICs)) and/or a wireless communications integrated circuit (wireless IC) and may supply a converted DC voltage to the one or more ICs, similar to that previously described in connection with FIG. 6. In some implementations, the main phone board portion may also comprise another power converter (e.g., a buck/boost converter) and/or an MSM processor. Thus, by selectively connecting one of the plurality of rectified DC voltages from one of the front-end circuits 920a and 920b and feeding them to the converter circuitry 922 (e.g., a charge pump circuit), a chargeable device may utilize the same two charge ports (612, 914) to provide universal charging compatibility with wireless chargers operating in accordance with multiple wireless charging standards.

In particular implementations, operation of the converter circuitry 922 may be configured by one or more circuits within the chargeable device. The one or more circuits may configure any aspect of the operation of converter circuitry 922 for different applications in accordance with different implementations, including but not limited to the voltage level of the threshold, the voltage level that the converter circuitry 922 should be configured to produce, the range in which output voltage may be scaled within, and the scaling factor by which different output voltages may be produced by multiplying the input voltage by the scaling factor. The one or more circuits may set any aspect of the operation of converter circuitry 922 by communicating the configuration for the aspect of the operation of converter circuitry 922 to the converter circuitry 922. In certain implementations, an aspect of operation of converter circuitry 922 may be set by over-voltage protection circuitry and/or under-voltage detection circuitry. The over-voltage protection and under-voltage detection circuitry may be any circuitry on a chargeable device configured to manage the voltage, current or power input to the chargeable device.

Figure 10:
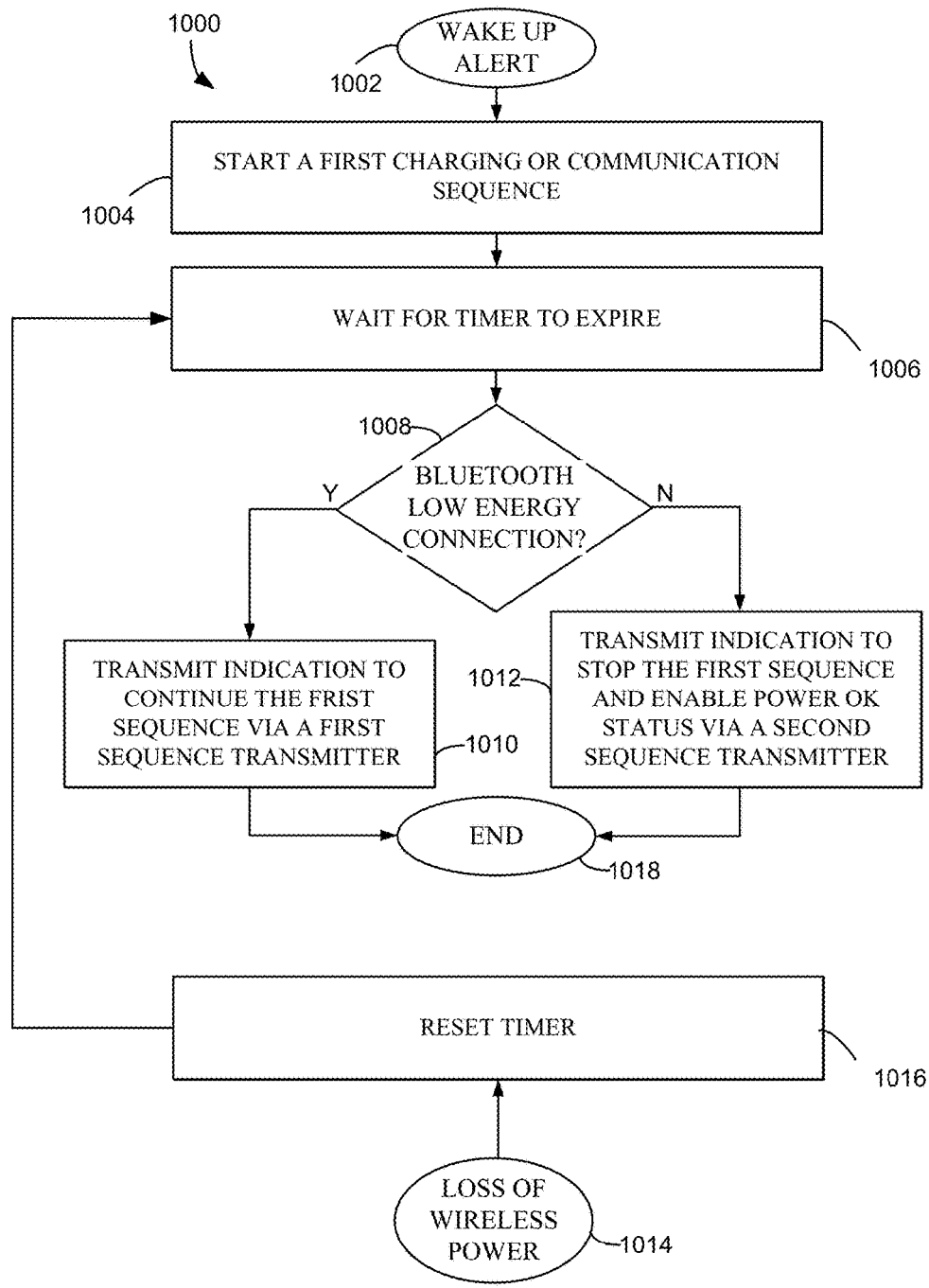
FIG. 10 is a flow chart for time-based detection of one or more wireless charging protocols, in accordance with an exemplary implementation.

FIG. 10 is a flow chart 1000 for time-based detection of one or more wireless charging protocols, in accordance with an exemplary implementation. The flowchart 1000 may correspond to the circuitry previously discussed in connection with either of FIG. 6 or 9, for example. The flow chart 1000 may begin with a wake up alert at block 1002. The flowchart 1000 may then advance to block 1002 where a first charging or communication sequence may be started for a particular wireless charging standard. The flowchart 1000 may then advance to block 1004, which includes waiting a predetermined amount of time for a timer to expire (e.g., 3 seconds, as a non-limiting example). Once the timer has expired, the flowchart 1000 may advance to block 1008 where it is determined whether a Bluetooth low energy connection is detected as available. If the determination is YES, the flowchart 1000 may advance to block 1010 where a first sequence transmitter (e.g., a transmitter configured to communicate according to the first sequence) within the wirelessly chargeable device (e.g., mobile phone) may transmit an indication to the charger to continue the first charging or communication sequence that was started in block 1004. If the determination at block 1008 is NO, the flowchart 1000 may alternatively advance to block 1012 where a second sequence transmitter (e.g., a transmitter configured to communicate according to a second charging or communication sequence different from the first sequence) within the wirelessly chargeable device (e.g., a mobile phone) may transmit an indication to stop the first sequence of block 1004 and enable a "POWER OK" status. From either of blocks 1010 and 1012, the flowchart 1000 may advance to END block 1018. If at any time during the flowchart 1000 wireless power is discontinued, as at block 1014, the flowchart 1000 may advance to block 1016, which includes resetting the timer discussed in connection with block 1006. The flowchart 1000 may then advance to block 1006, where the mobile device may wait for the timer to expire.

Although specific wireless charging protocols, time frames, types of wireless communications and transmitters may be discussed in connection with flowchart 1000, they are exemplary only and any wireless charging protocols, time frames, types of wireless communications and transmitters may be substituted while still remaining within the scope of this description.

Figure 11:
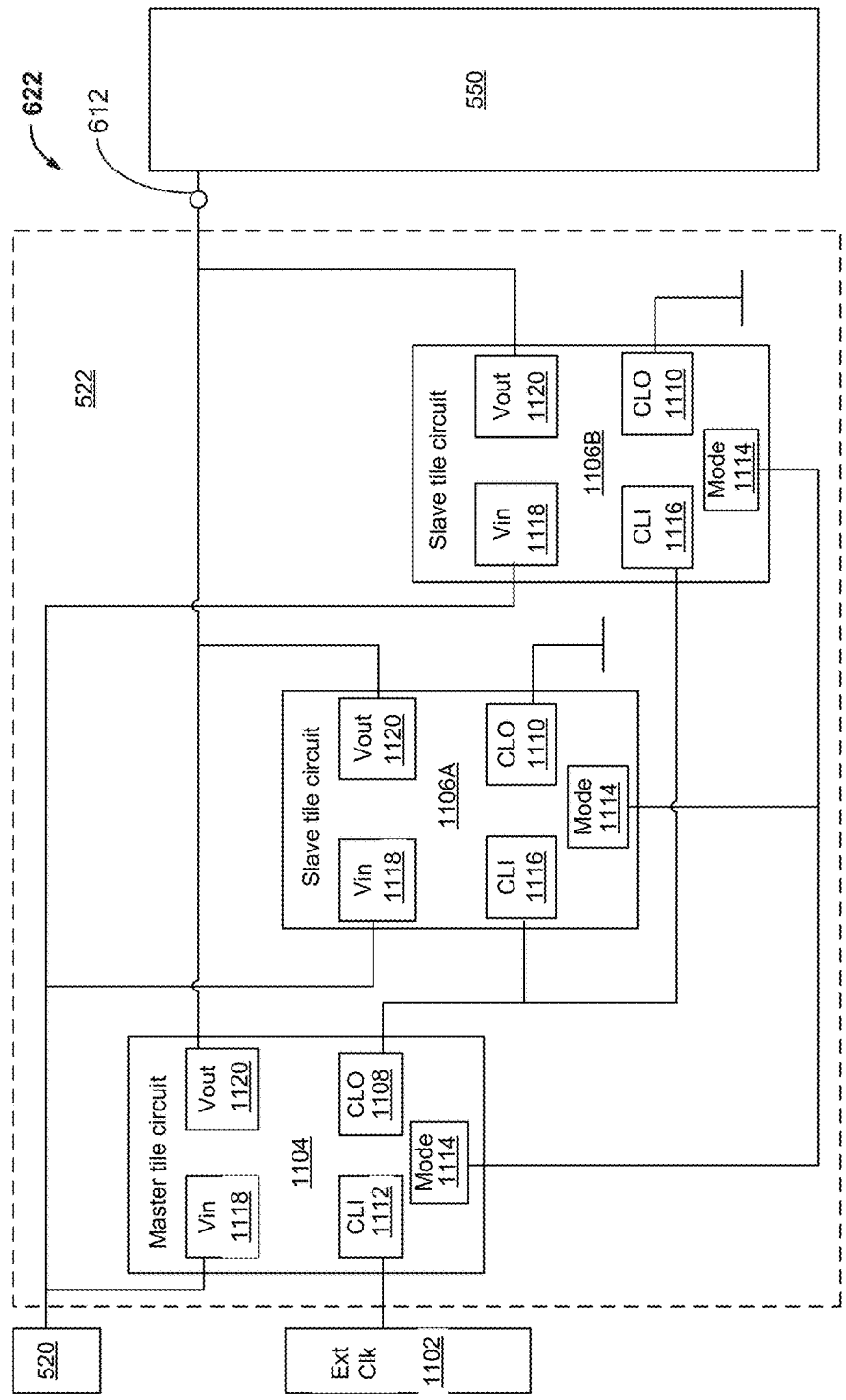
FIG. 11 is a block diagram of the converter circuitry of FIG. 5, 6 or 9 implemented as multiple tile circuits in accordance with an exemplary implementation.

FIG. 11 is a block diagram of the converter circuitry of FIG. 5, 6 or 9 implemented as multiple tile circuits in accordance with an exemplary implementation. In the illustrated implementation, the converter circuitry 622 includes a master tile circuit 1104 (e.g., a master charge pump circuit) and slave tile circuits 1106A, 1106B (e.g., slave charge pump circuits). Such an arrangement may provide for scalability of the converter circuitry 622 by implementing multiple tile circuits in parallel. This may also enable increased power handling for different power levels in accordance with different implementations. The converter circuitry 622 receives an input voltage from one of the front-end circuits 620a-620c, via the first charging port 612 that is at both the output of the switching circuit 610 and the input of the converter circuitry 622, and generates an output voltage eventually fed to the chargeable device 650 via the charging circuit 624.

In certain implementations, the master tile circuit 1104 dictates the operation of the slave tile circuits 1106A, 1106B. The slave tile circuits 1106A, 1106B may be assigned to a "slave" designation by setting a clock output port 1110 of the slave tile circuit to a particular voltage level (such as but not limited to ground). Similarly, the master tile circuit 1104 may be assigned to a "master" designation by not setting a clock output port of the master tile circuit 1108 to the particular voltage level used to designate a slave tile circuit (such as but not limited to ground). Each of the tile circuits may be driven by a clock signal determined by an external clock 1102. In particular implementations, the slave tiles may be configured to use a different phase of the clock signal from that utilized by the master tile. In certain implementations, slave tiles may be configured to use a different phase of the clock signal from that utilized by the master tile to lessen output ripple and noise. The external clock 1102 may be connected to the clock input port 1112 of the master tile circuit to drive the master tile circuit with the clock signal. The master tile circuit 1104 may then operate according to the clock signal and also drive the slave tile circuits 1106A, 1106B to operate according to the clock signal via the connection between the master tile circuit's clock output port and the slave tile circuit's clock input port 1116. Although the external clock 1102 is presented in the illustrated implementation as being external to the converter circuitry 622, the external clock may be implemented in any manner, such as but not limited to being part of the converter circuitry 622 or internal to a tile circuit (such as but not limited to a master tile circuit 1104).

In certain implementations, an operational mode of the converter circuit 622 may be synchronized across each of the tile circuits of the converter circuit 622 and be controlled by the master tile circuit 1104. The master tile circuit 1104 may control the operational mode of the slave tile circuits 1106A, 1106B via a connection between the mode port of each of the tile circuits. The types of modes may include the way that the converter circuitry 622 receives an input voltage and produces an output voltage that is scaled to a value of the input voltage based on the relationship between the input voltage and the first voltage level threshold. Certain examples of modes may include modes of producing an output voltage that is scaled to: a reduced value of the input voltage, an increased value of the input voltage or the same value as the input voltage of the converter circuitry 622.

In select implementations, each of the tile circuits 1104, 1106A, 1106B receives the input voltage of the converter circuitry 622 via each respective voltage input port 1118. Also, each of the tile circuits 1104, 1106A, 1106B may produce an output voltage via each respective voltage output port 1120, which is also the output voltage of the converter circuitry 622. Each tile circuit 1104, 1106A, 1106B may produce output voltage at the same voltage level. However, each tile circuit 1104, 1106A, 1106B produces its output voltage along with a particular amount of current. Therefore, the power presented at the output of the converter circuitry 622 may be increased based upon the amount of current produced by the combination of the tile circuits 1104, 1106A, 1106B of the converter circuitry 622 (which each produces an output voltage at the same voltage level). For example, in certain implementations power output by the converter circuitry 622 may be increased by increasing the number of tile circuits used by the converter circuitry 622.

In particular implementations, converter circuitry 622 may be implemented as charge pump circuitry. Charge pump circuitry may be implemented to convert DC voltages from one voltage level to another voltage level using capacitors as energy storage elements. In a number of implementations, converter circuitry 622 may be implemented as charge pump circuitry in any manner for receiving an input voltage and producing an output voltage that is scaled to a value of the input voltage based on the relationship between the input voltage and a voltage level threshold. Certain non-limiting examples of how the converter circuitry 622 may be implemented as charge pump circuitry may include (but is not limited to) where all tile circuits may be implemented as charge pump circuitry, where the converter circuitry 622 may be implemented as a single tile circuit of charge pump circuitry, or where the converter circuitry 622 is partially implemented as charge pump circuitry.

Figure 12:
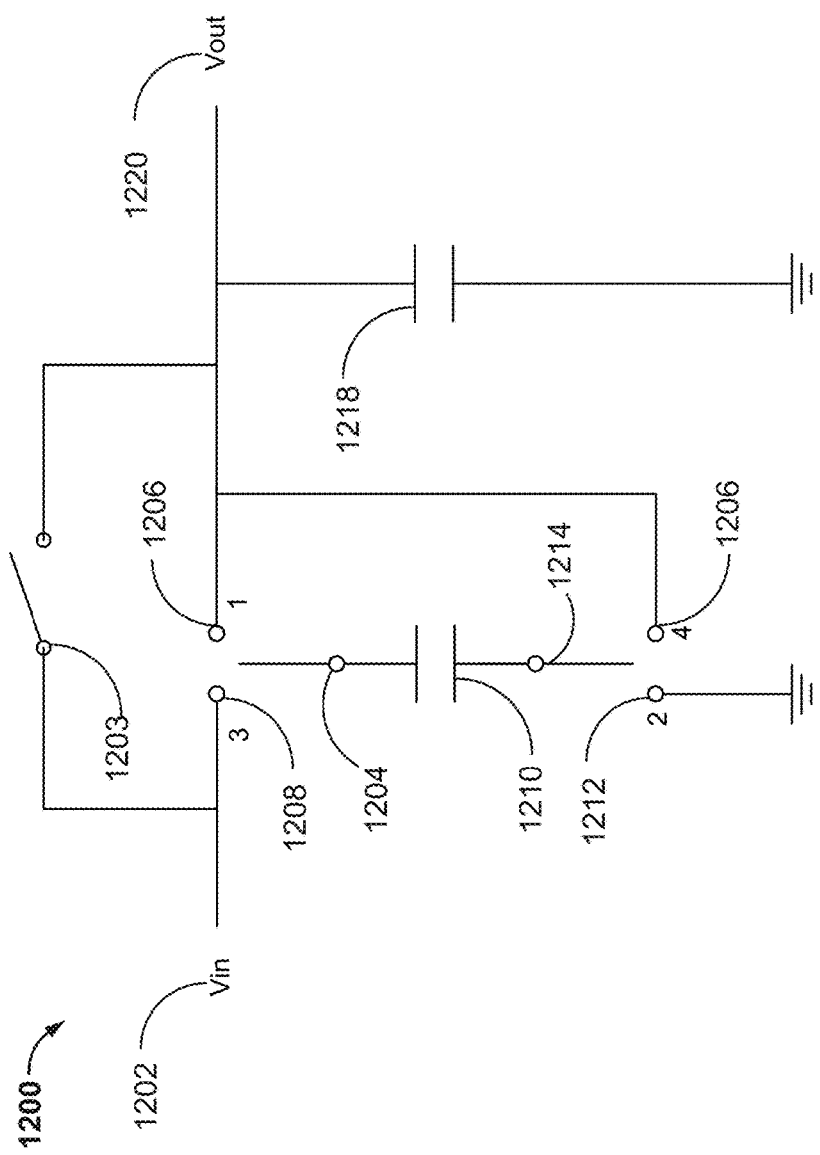
FIG. 12 is a schematic diagram of converter circuitry implemented as charge pump circuitry that may be used in the receiver of FIG. 5, 6 or 9, in accordance with an exemplary implementation.

FIG. 12 is a schematic diagram of converter circuitry implemented as charge pump circuitry that may be used in the receiver of FIG. 5, 6 or 9, in accordance with an exemplary implementation. The charge pump circuitry 1200 may be configured to receive an input voltage 1202 at an input to the charge pump circuitry 1200 derived from the wirelessly received power. The charge pump circuitry may also produce an output voltage 1220 at an output of the charge pump circuitry 1200 that is scaled to a reduced value of the input voltage when the input voltage is above a first voltage level threshold. The charge pump circuitry 1200 may include a first switch 1203, a second switch 1204, and a third switch 1214. When the input voltage is at or below a first voltage level, the first switch 1203 is closed and both the second switch 1204 and the third switch 1214 may operate in a first mode where the first switch 1204 is connected to a first node 1206 and the second switch 1214 is connected to a second node 1212. When the input voltage is above the first voltage level threshold, the first switch 1203 is open and both the second switch 1204 and third switch 1214 may operate in a second mode where the first switch 1204 is alternately connected to a first node 1206 or to a third node 1208 and the second switch 1214 is alternately connected to a second node 1212 or to a fourth node 1206 The operation of the charge pump circuitry 1200 in the first mode enables the charge pump circuitry 1200 to directly connect the input voltage 1202 of the charge pump circuitry 1200 to the output voltage 1220 of the charge pump circuitry 1200. Similarly, the operation of the charge pump circuitry 1200 in the second mode configures the charge pump circuitry 1200 to receive an input voltage 1202 derived from the wirelessly received power and produce an output voltage 1220 that is scaled to a reduced value of the input voltage 1202 when the input voltage 1202 is above a first voltage level threshold. In certain implementations, the scaled value of the output voltage 1220 is half of the value of the input voltage 1202. In the second mode, a first capacitor 1210 with a first end alternately coupled to the input voltage 1202 or the output voltage 1220 and a second end alternately coupled to the output voltage 1220 or ground is utilized to produce an output voltage 1220 that is scaled to a reduced value of the input voltage 1202. In certain implementations, a second capacitor 1218 may be coupled between the output voltage 1220 and ground to store the output voltage 1220 at the output to the charge pump circuitry 1200 and reduce the voltage noise generated by the charge pump. In certain implementations, the properties and configuration of the components that make up the charge pump circuitry 1200 may be modified to achieve different scaling for the output voltage as a reduced value of the input voltage (or as an increased value of the input voltage when the charge pump circuitry is implemented in reverse).

Figure 13:
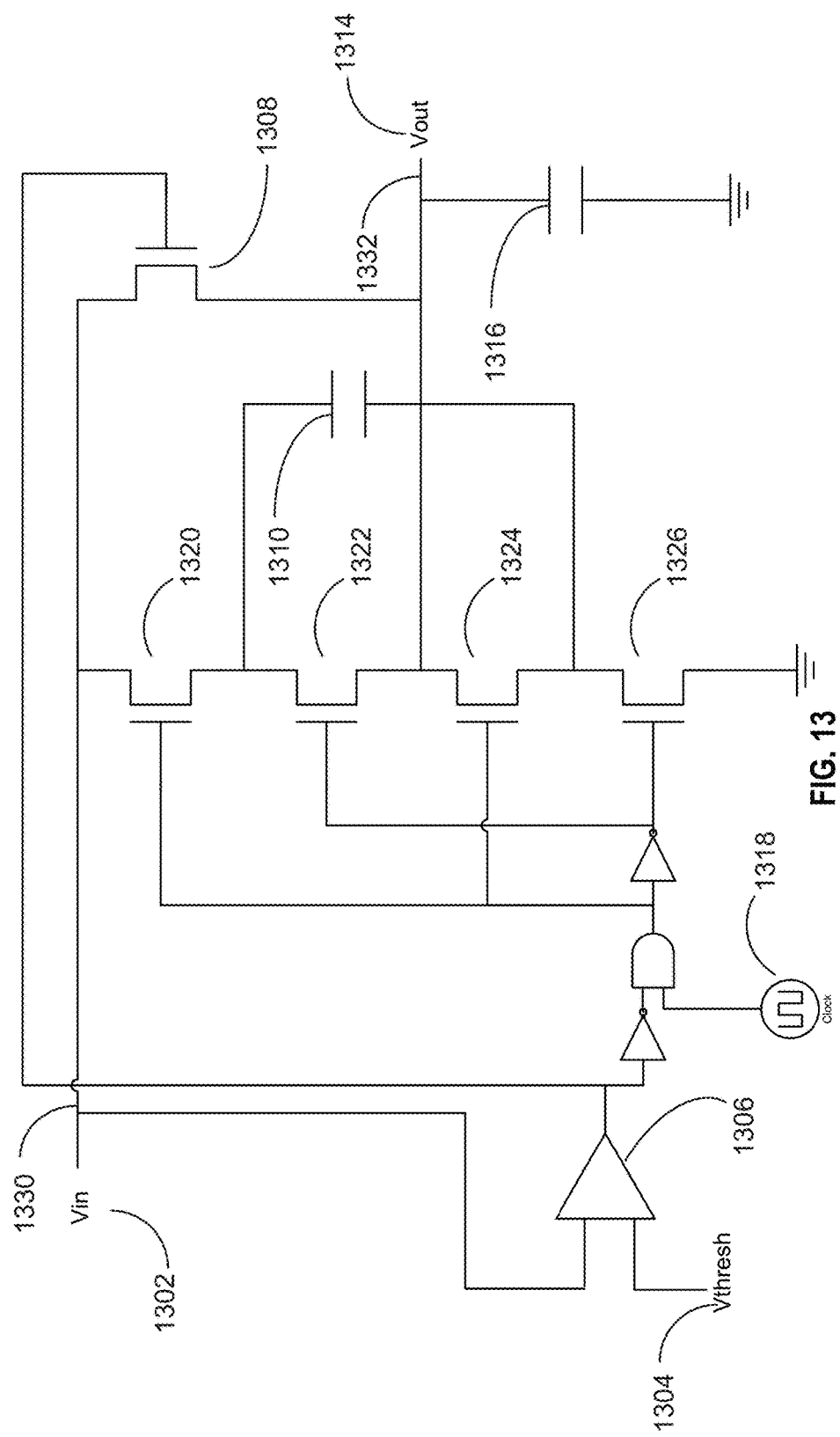
FIG. 13 is a schematic diagram of converter circuitry implemented as charge pump circuitry with comparators that may be used in the receivers of FIG. 5, 6 or 9 in accordance with an exemplary implementation.

FIG. 13 is a schematic diagram of converter circuitry implemented as charge pump circuitry with comparators that may be used in the receivers of FIG. 5, 6 or 9 in accordance with an exemplary implementation. The charge pump circuitry 1300 utilizes a first comparator 1306 (e.g., a comparator circuit) that compares the input voltage 1302 with a voltage level threshold 1304 to operate a first transistor 1308 that enables the input voltage 1302 to pass to the output when the input voltage is at or lower than the voltage level threshold 1304. When the input voltage is higher than the voltage level threshold 1304, the comparator 1306 disables transistor 1308 and enables the clock signal 1318 to pass through and operate alternately transistors (1320, 1324) and (1322, 1326) to transfer charge from input voltage node 1330 to output node 1332, and provide at the output a scaled down voltage relative to Vin.

Although various circuit topographies for converter circuits (and converter circuits implemented as charge pump circuitry) are discussed above, different circuit topographies may be utilized with different circuit components in different configurations in the implementation of converter circuits in accordance with certain implementations.

Figure 14:
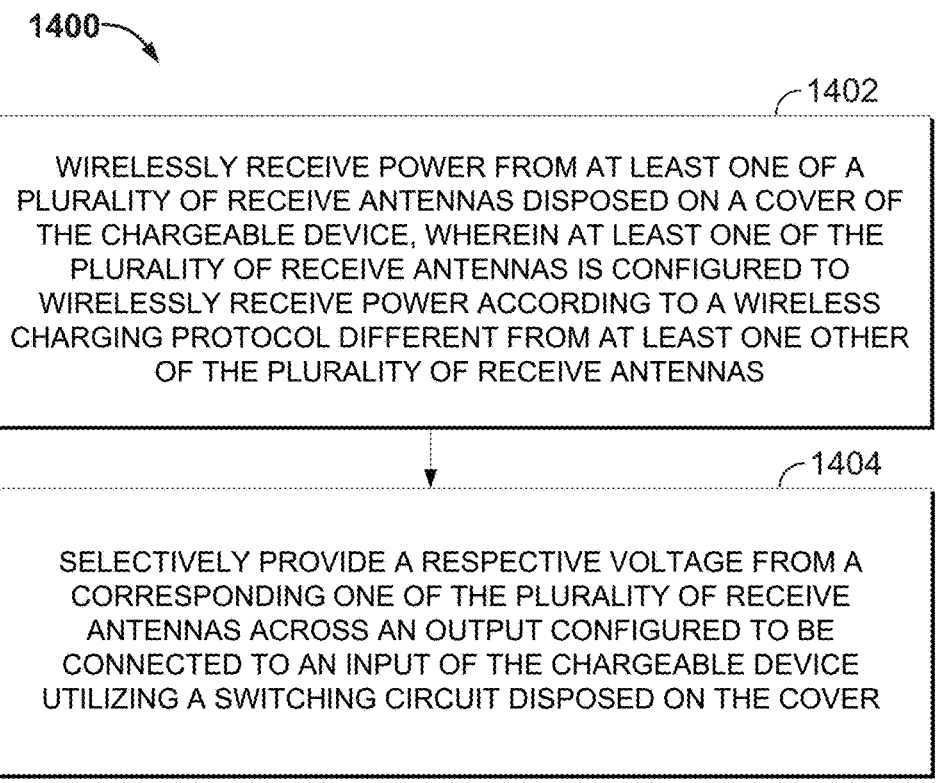
FIG. 14 is a flowchart of an exemplary method for charging a chargeable device, in accordance with an exemplary implementation.

FIG. 14 is a flowchart 1400 of an exemplary method for charging a chargeable device, in accordance with an exemplary implementation. In certain implementations, the process 1400 may be performed on or by a back cover of a wirelessly chargeable device, for example a mobile phone, as previously described in connection with any of FIGS. 5-9. Although the process in FIG. 14 is illustrated in a particular order, in certain implementations the blocks herein may be performed in a different order, simultaneously, or omitted, and additional blocks may be added. A person of ordinary skill in the art will appreciate that the process of the illustrated implementation may be implemented in any chargeable device that may be configured to wirelessly receive power for charging or operating a chargeable device.

Block 1402 may include wirelessly receiving power from at least one of a plurality of receive antennas disposed on a cover of the chargeable device. In some implementations, the cover may be a back cover, although the present application is not so limited. The at least one of the plurality of receive antennas is configured to wirelessly receive power according to a wireless charging protocol different from at least one other of the plurality of receive antennas.

Block 1404 may include selectively providing a respective voltage from a corresponding one of the plurality of receive antennas across an output configured to be connected to an input of the chargeable device utilizing a switching circuit disposed on the cover. In some implementations, the input may comprise first and second input terminals and the output may comprise first and second output terminals configured to physically and electrically contact the first and second input terminals.

Figure 15:
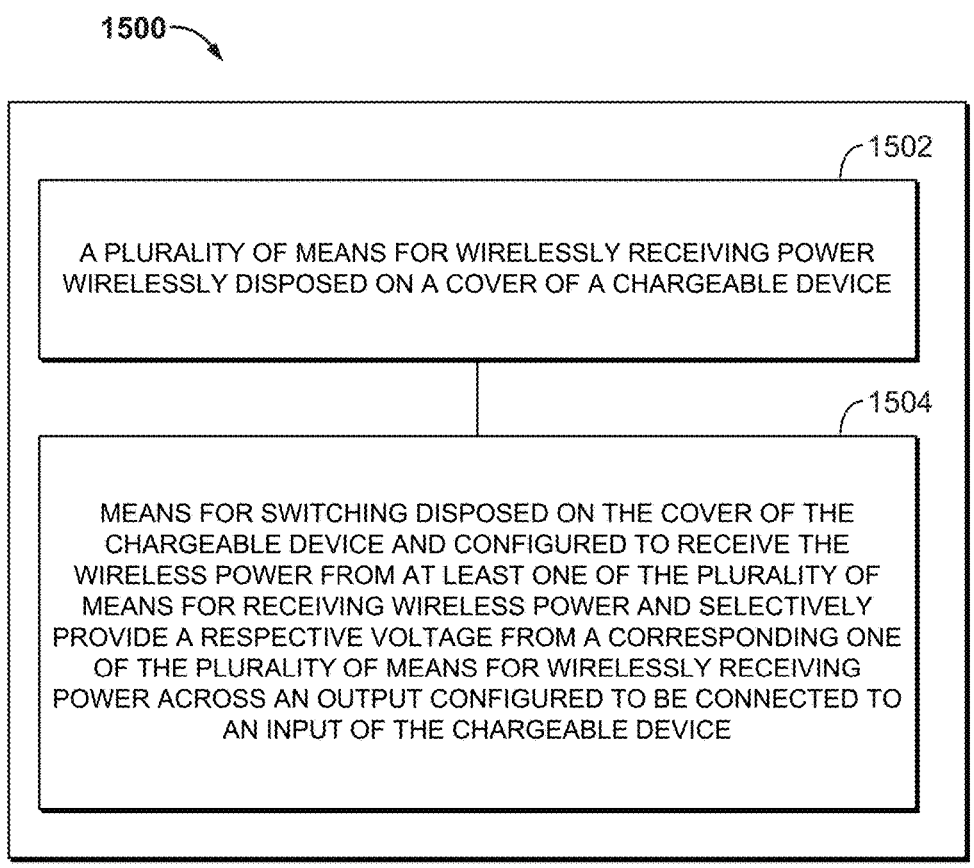
FIG. 15 is a functional block diagram of a wireless power receiver apparatus for charging a chargeable device, in accordance with an exemplary implementation.

FIG. 15 is a functional block diagram of a wireless power receiver apparatus 1500 for charging a chargeable device, in accordance with an exemplary implementation. The apparatus 1500 comprises means 1502 and means 1504 for the various actions previously discussed with respect to FIGS. 5-9. The apparatus 1500 includes a plurality of means 1502 for wirelessly receiving power disposed on a cover of a chargeable device. In some implementations the cover may comprise a back cover of the chargeable device, although the present application is not so limited. At least one of the plurality of means for wirelessly receiving power is configured to wirelessly receive power according to a wireless charging protocol different from at least one other of the plurality of means for receiving power wirelessly. In an implementation, means 1502 may be configured to perform one or more of the functions discussed above with respect to block 1402 of FIG. 14. In various implementations, the means 1502 may be implemented by the plurality of receiver coils 618a-618c (FIG. 6) or 918a and 918b (FIG. 9).

The apparatus 1500 further includes means 1504 for switching disposed on the cover of the chargeable device and configured to receive the wireless power from at least one of the plurality of means for receiving wireless power and selectively provide a respective voltage from a corresponding one of the plurality of means for wirelessly receiving power across an output configured to be connected to an input of the chargeable device. In some implementations, the input may comprise first and second input terminals and the output may comprise first and second output terminals configured to physically and electrically contact the first and second input terminals. In an implementation, means 1504 may be configured to perform one or more of the functions discussed above with respect to block 1404 of FIG. 14. In various implementations, the means 1504 may be implemented by the switching circuit 610 (FIG. 6) or the switching circuit 910 (FIG. 9).

Figure 16:
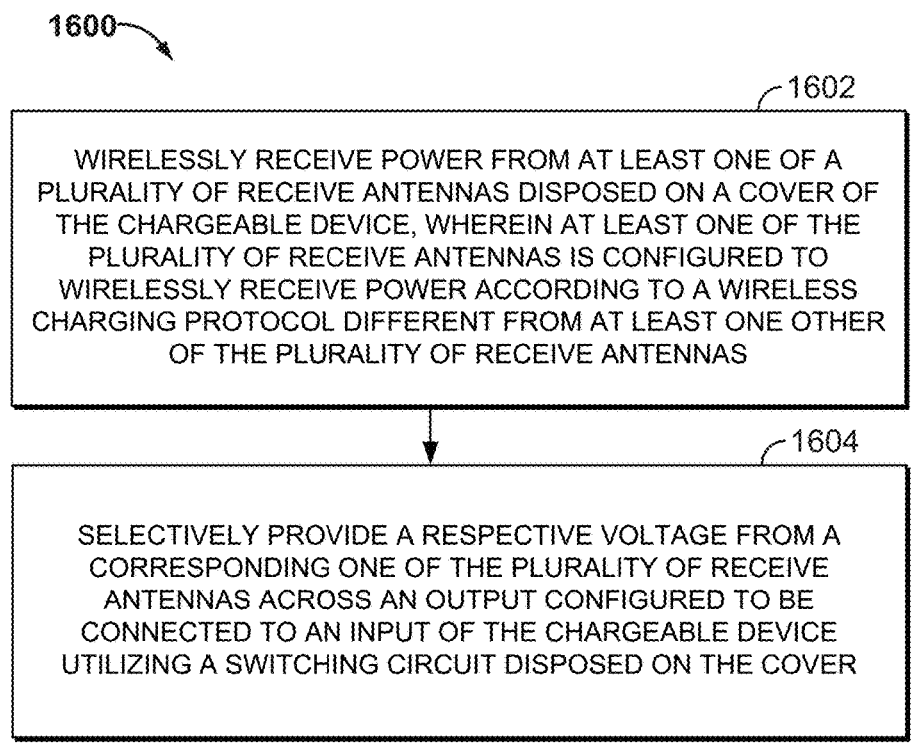
FIG. 16 is a flowchart of an exemplary method for charging a wirelessly chargeable apparatus, in accordance with an exemplary implementation.

FIG. 16 is a flowchart 1600 of an exemplary method for charging a wirelessly chargeable apparatus, in accordance with an exemplary implementation. In certain implementations, the process 1600 may be performed by a chargeable device as previously described in connection with any of FIGS. 5-13. Although the process in FIG. 16 is illustrated in a particular order, in certain implementations the blocks herein may be performed in a different order, simultaneously, or omitted, and additional blocks may be added. A person of ordinary skill in the art will appreciate that the process of the illustrated implementation may be implemented in any receiver that may be configured to charge or supply power to a chargeable device via the wireless transfer of power.

Block 1602 may include selectively receiving an input voltage, across an input of the chargeable device, from one of a plurality of receive antennas disposed on a cover of the chargeable device. In some implementations, the cover may comprise a back cover of the chargeable device, although the present application is not so limited. In some implementations, the input may comprise first and second input terminals. Block 1604 may include producing an output voltage that is scaled relative to the input voltage based on a relationship between the input voltage and a voltage level threshold.

Figure 17:
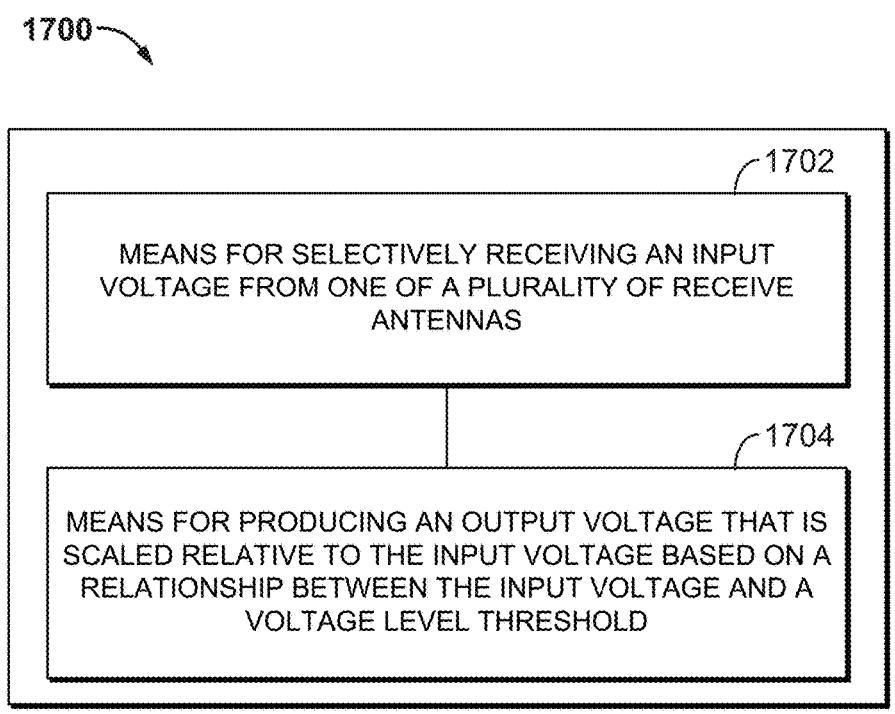
FIG. 17 is a functional block diagram of a wirelessly chargeable apparatus, in accordance with an exemplary implementation.

FIG. 17 is a functional block diagram of a wirelessly chargeable apparatus 1700, in accordance with an exemplary implementation. The apparatus 1700 comprises means 1702 and means 1704 for the various actions discussed with respect to FIGS. 5-13 and 16. The apparatus 1700 includes means 1702 for selectively receiving an input voltage from one of a plurality of receive antennas. In an implementation, means 1702 may be configured to perform one or more of the functions discussed above with respect to block 1602 of FIG. 16. In various implementations, the means 1702 may be implemented by the converter circuit 622 (FIG. 6) or the converter circuit 922 (FIG. 9).

The apparatus 1700 further includes means 1704 for producing an output voltage that is scaled relative to the input voltage based on a relationship between the input voltage and a voltage level threshold. In an implementation, means 1704 may be configured to perform one or more of the functions discussed above with respect to block 1604 of FIG. 16. In various implementations, the means 1704 may be implemented by the converter circuit 622 (FIG. 6) or the converter circuit 922 (FIG. 9).

Figure 18:
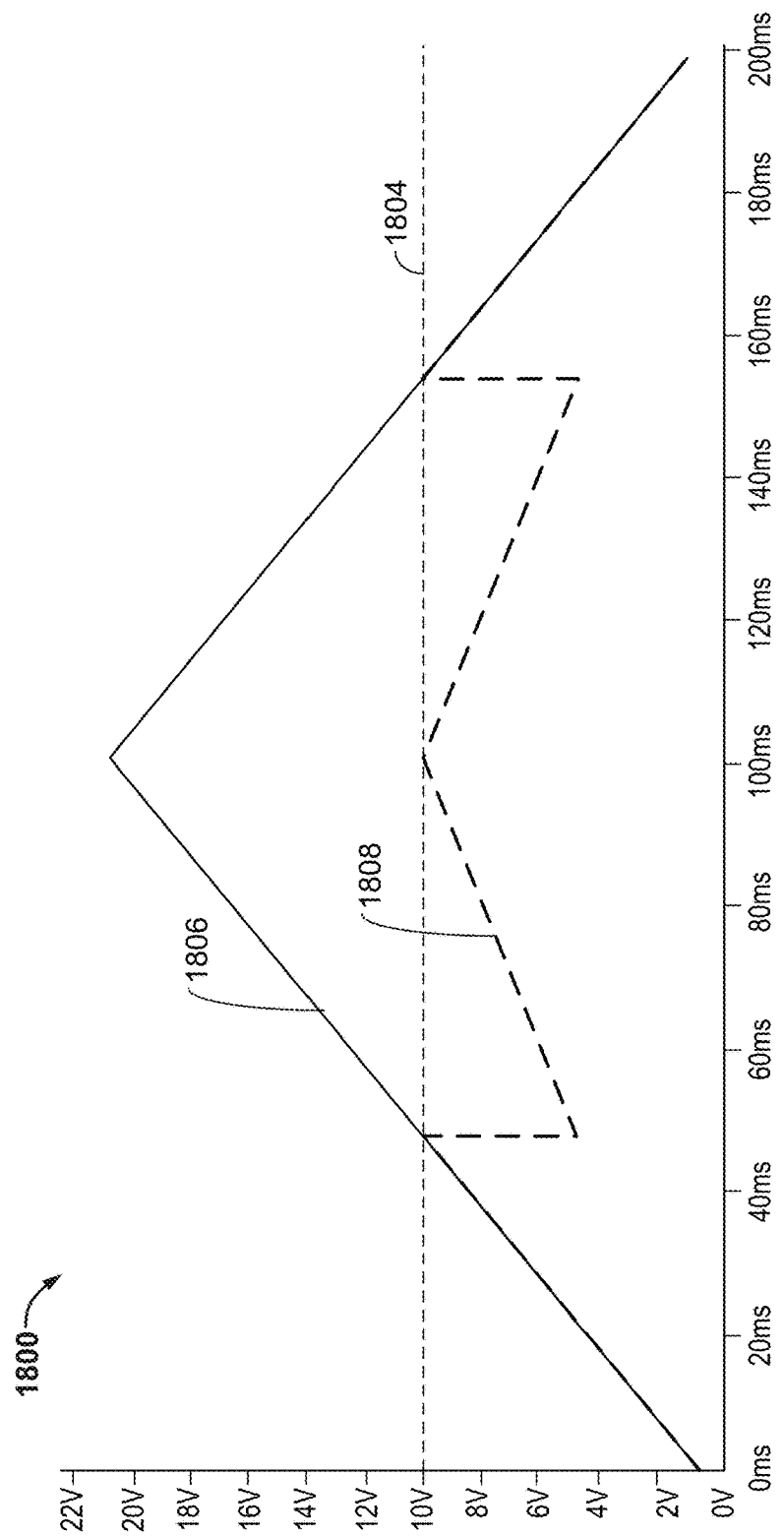
FIG. 18 is a plot of exemplary input and output voltages of converter circuitry in accordance with an exemplary implementation.

FIG. 18 is a plot 1800 of exemplary input and output voltages of converter circuitry in accordance with an exemplary implementation. The plot illustrates how both input voltage 1806 (solid line) and output voltages 1808 (heavy dashed line) are plotted with respect to time. Although particular voltages and time scales are illustrated in FIG. 18, they are exemplary only and not limiting. The voltages and time scales may be any value depending on the particular implementation. As illustrated, when the input voltage 1806 is below a voltage level threshold 1804 (approximately 10V in the non-limiting illustrated implementation), the input voltage 1806 and output voltage 1808 are the same (e.g., they track one another). When the input voltage 1806 is above the first voltage level threshold 1804, the output voltage 1808 is scaled to a reduced value of the input voltage 1806 (e.g., approximately ½ of the input voltage level in the non-limiting illustrated implementation). Although certain implementations are discussed above, there are many additional ways to implement converter circuitry in accordance with different implementations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of certain implementations have been described herein. It is to be understood that not necessarily all such advantages may be achieved in accordance with any particular implementation. Thus, the implementations may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. A wirelessly chargeable apparatus, comprising:
   an input configured to be connected to an output of a cover of the chargeable apparatus; and
   a converter circuit configurable to be coupled to one of a plurality of receive antennas on the cover of the chargeable apparatus via the input, the one of the plurality of receive antennas configured to wirelessly receive power according to a wireless charging protocol different from at least one other of the plurality of receive antennas, the converter circuit configured to:
   selectively receive an input voltage from the one of the plurality of receive antennas;
   operate in a first mode to produce a first output voltage, at an output of the converter circuit, that is substantially equal to the input voltage based on a first relationship between the input voltage and a voltage level threshold; and
   operate in a second mode to produce a second output voltage, at the output of the converter circuit, that is scaled relative to the input voltage based on a second relationship between the input voltage and the voltage level threshold.

2. The apparatus of claim 1, wherein the converter circuit is configured to operate in the first mode and produce the first output voltage when the input voltage is less than the voltage level threshold.

3. The apparatus of claim 1, wherein the converter circuit is configured to operate in the second mode and produce the second output voltage by multiplying the input voltage by a scaling factor when the input voltage is greater than or equal to the voltage level threshold.

4. The apparatus of claim 1, wherein the converter circuit comprises a charge pump circuit.

5. The apparatus of claim 4, wherein the charge pump circuit is disposed on an integrated circuit that is physically separate from at least a rectifier circuit connected to one or more of the plurality of receive antennas and disposed on the cover of the chargeable apparatus.

6. The apparatus of claim 4, wherein the charge pump circuit comprises a comparator circuit configured to compare the input voltage to the voltage level threshold and configures the charge pump circuit to produce the second output voltage that is scaled to a value relative to the input voltage.

7. The apparatus of claim 6, wherein the charge pump circuitry is configured to multiply the input voltage by a scaling factor equal to a rational number.

8. The apparatus of claim 1, wherein the converter circuit comprises a master charge pump circuit and at least one slave charge pump circuit connected in parallel with the master charge pump circuit, wherein the master charge pump circuit is configured to control the operation of the at least one slave charge pump circuit.

9. The apparatus of claim 8 wherein each of the master charge pump circuit and the at least one slave charge pump circuit provide the output voltage.

10. The apparatus of claim 8, wherein an amount of power provided by the converter circuit is based at least in part on a total amount of current provided at the output voltage from the master charge pump circuit and the at least one slave charge pump circuit.

11. The apparatus of claim 1, comprising a communication circuit configured to communicate with at least one of a plurality of chargers for controlling a charging sequence.

12. The apparatus of claim 1, wherein the converter circuitry is configured to selectively produce the second output voltage that is scaled to a value that is half of the input voltage.

13. A method for wirelessly charging a chargeable device, comprising:
  selectively receiving an input voltage at an input of the chargeable device, from one of a plurality of receive antennas disposed on a cover of the chargeable device, the one of the plurality of receive antennas configured to wirelessly receive power according to a wireless charging protocol different from at least one other of the plurality of receive antennas;
  operating in a first mode to produce a first output voltage that is substantially equal to the input voltage based on a first relationship between the input voltage and a voltage level threshold; and
  operating in a second mode to produce a second output voltage that is scaled relative to the input voltage based on a second relationship between the input voltage and the voltage level threshold.

14. The method of claim 13, comprising operating in the first mode to produce the first output voltage when the input voltage is less than the voltage level threshold.

15. The method of claim 13, comprising operating in the second mode to produce the second output voltage by multiplying the input voltage by a scaling factor when the input voltage is greater than or equal to the voltage level threshold.

16. The method of claim 13, comprising producing the output voltage utilizing a charge pump circuit.

17. The method of claim 16, the charge pump circuit is disposed on an integrated circuit that is physically separate from a rectifier circuit connected to one or more of the plurality of receive antennas and disposed on the cover of the chargeable apparatus, the rectifier circuit configured to generate the input voltage.

18. The method of claim 16, wherein the charge pump circuit comprises a master charge pump circuit connected in parallel with at least one slave charge pump circuit, the method comprising controlling the operation of the at least one slave charge pump circuit via the master charge pump circuit.

19. The method of claim 13, comprising communicating with at least one of a plurality of chargers via a communications circuit for controlling a charging sequence.

20. A wirelessly chargeable apparatus, comprising:
  input means connected to an output of a cover of the chargeable apparatus; and
  converting means coupled to one of a plurality of receiving means on the cover of the chargeable apparatus via the input means, the one of the plurality of receiving means configured to wirelessly receive power according to a wireless charging protocol different from at least one other of the plurality of receiving means, the converting means configured to:
  selectively receive an input voltage from the one of the plurality of receiving means;
  operate in a first mode to produce a first output voltage, at an output of the converting means, that is substantially equal to the input voltage based on a first relationship between the input voltage and a voltage level threshold; and
  operate in a second mode to produce a second output voltage, at the output of the converting means, that is scaled relative to the input voltage based on a second relationship between the input voltage and the voltage level threshold.

* * * * *